United States Patent [19]

(12) United States Patent
Liao et al.

(10) Patent No.: US 11,054,577 B1
(45) Date of Patent: Jul. 6, 2021

(54) HYBRID FIBER COUPLER AND MANUFACTURING METHOD THEREOF

(71) Applicant: SHENZHEN UNIVERSITY, Shenzhen (CN)

(72) Inventors: Changrui Liao, Shenzhen (CN); Yiping Wang, Shenzhen (CN); Chupao Lin, Shenzhen (CN); Yunfang Zhang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 559 days.

(21) Appl. No.: 15/999,683

(22) PCT Filed: Oct. 31, 2017

(86) PCT No.: PCT/CN2017/108563
§ 371 (c)(1),
(2) Date: Aug. 17, 2018

(87) PCT Pub. No.: WO2019/084766
PCT Pub. Date: May 9, 2019

(51) Int. Cl.
G02B 6/125 (2006.01)
G02B 6/255 (2006.01)
(Continued)

(52) U.S. Cl.
CPC .......... *G02B 6/125* (2013.01); *G02B 6/2551* (2013.01); *G02B 6/02385* (2013.01); *G02B 6/4293* (2013.01)

(58) Field of Classification Search
CPC .. G02B 6/02385; G02B 6/125; G02B 6/2551; G02B 6/4293
See application file for complete search history.

(56) References Cited

U.S. PATENT DOCUMENTS 4,608,344 A * 8/1986 Carter ................ G01N 21/6452
356/414
5,111,525 A 5/1992 Hartouni
(Continued)

FOREIGN PATENT DOCUMENTS

CN 205449794 U 8/2016
CN 106556575 A 4/2017
(Continued)

OTHER PUBLICATIONS

International Search Report dated May 30, 2018 for corresponding International Application No. PCT/CN2017/108563, filed Oct. 31, 2017.

*Primary Examiner* — Ryan A Lepisto

(57) ABSTRACT

The present application is applicable to the fiber optics field and provides a hybrid fiber coupler including a lead-in single mode fiber, a coreless fiber, a hollow glass tube and a lead-out single mode fiber fusion-spliced sequentially. Both the lead-in single mode fiber and the lead-out single mode fiber include cores and claddings. Cores of the lead-in single mode fiber and the lead-out single mode fiber are not in the same horizontal direction. A curved waveguide is inscribed inside the coreless fiber and the hollow glass tube and cores of the lead-in single mode fiber and the lead-out single mode fiber are connected with said curved waveguide. The hollow glass tube has a micro-channel at either end thereof, and the two micro-channels form a microfluidic channel with the center of the hollow glass tube for allowing the analytical liquid to access the hollow glass tube. The hybrid waveguide coupler according to embodiments of the present application features cheap manufacturing materials, simple structure and ease of fabrication.

6 Claims, 4 Drawing Sheets

(51) Int. Cl.
*G02B 6/42* (2006.01)
*G02B 6/02* (2006.01)

(56) References Cited

U.S. PATENT DOCUMENTS

| | | | | |
|---|---|---|---|---|
| 5,141,548 | A | * | 8/1992 | Chervet .................. G01N 21/05 264/249 |
| 5,184,192 | A | * | 2/1993 | Gilby ................. G01N 21/0303 138/DIG. 3 |
| 5,423,513 | A | * | 6/1995 | Chervet .................. G01N 21/05 250/227.25 |
| 5,444,807 | A | * | 8/1995 | Liu ........................ G01N 30/74 204/452 |
| 6,526,188 | B2 | * | 2/2003 | Dourdeville ........... G01N 21/05 250/227.11 |
| 6,987,897 | B2 | * | 1/2006 | Elster ..................... G01N 21/05 385/12 |
| 7,403,280 | B2 | * | 7/2008 | Beigel ..................... B01L 3/561 356/246 |
| 7,830,503 | B2 | * | 11/2010 | Hong ..................... G01N 21/05 356/246 |
| 8,441,645 | B2 | * | 5/2013 | Prabhakar .............. G01N 21/05 356/440 |
| 8,564,768 | B2 | * | 10/2013 | Schroeder ............. G01J 3/0291 356/246 |
| 2005/0257885 | A1 | * | 11/2005 | Hobbs ................... G01N 21/05 156/293 |
| 2013/0109083 | A1 | * | 5/2013 | Llobera Adan ... B01L 3/502715 435/288.7 |

FOREIGN PATENT DOCUMENTS

| | | |
|---|---|---|
| CN | 106959172 A | 7/2017 |
| CN | 107272116 A | 10/2017 |
| CN | 107608030 A | 1/2018 |

* cited by examiner

HYBRID FIBER COUPLER AND MANUFACTURING METHOD THEREOF

CROSS-REFERENCE TO RELATED APPLICATION

This Application is a Section 371 National Stage Application of International Application No. PCT/CN2017/108563, filed Oct. 31, 2017.

TECHNICAL FIELD

The present application pertains to optical fiber technology field, and particularly relates to a hybrid fiber coupler and a manufacturing method thereof.

BACKGROUND

In prior art, a refractive index of analytical liquid is measured, mainly by the following methods.

1. Filling photonic crystal fiber: Selectively fill analytical liquid in one or more air voids according to natural air holes structure of a photonic crystal fiber and optical signals in the core of the fiber will experience directional coupling with the filled liquid waveguide. The disadvantage of this method is that the liquid waveguide is enclosed after filling analytical liquid, thus can not used for dynamic measurement of external environmental liquid.

2. Drawing special fibers: This method designs a special structure fiber with an air channel parallel to the fiber axis, and filling with analytical liquid therein to form a liquid waveguide capable of directional coupling with the core of fiber. The disadvantage of this method is that the used fiber is not a commercially available fiber and needs to be designed and customized, which results in high manufacturing costs.

SUMMARY

The technical problem to be addressed by the present application is to provide a hybrid fiber coupler and a manufacturing method thereof, which is intended to address the problem in prior art that dynamic measurement of external environment liquid can not be realized while measuring refractive index of the analytical liquid, and the manufacturing costs of fiber optics are high.

The present application is realized by a hybrid fiber coupler including a lead-in single mode fiber, a coreless fiber, a hollow glass tube and a lead-out single mode fiber fusion-spliced sequentially, wherein both said lead-in single mode fiber and said lead-out single mode fiber comprise cores and claddings, and cores of said lead-in single mode fiber and said lead-out single mode fiber are not in a same horizontal direction;

a curved waveguide is inscribed in said coreless fiber and said hollow glass tube, and the cores of said lead-in single mode fiber and said lead-out single mode fiber are connected with the curved waveguide;

said hollow glass tube has a micro-channel at either end respectively, the two micro-channels form a microfluidic channel with a center of said hollow glass tube for allowing an analytical liquid to access said hollow glass tube.

Further, said curved waveguide comprises a bent waveguide and a straight waveguide, wherein:

said bent waveguide is located in said coreless fiber, said straight waveguide is located in said hollow glass tube, and said straight waveguide is parallel to a central axis of said hollow glass tube.

An embodiment of the present application further provides a manufacturing method of the hybrid fiber coupler, including:

providing a coreless fiber, a hollow glass tube, a lead-in single mode fiber and a lead-out single mode fiber with preset lengths respectively, fusion-splicing a first end of said coreless fiber with said lead-in single mode fiber, and fusion-splicing a second end of said coreless fiber with a first end of said hollow glass tube;

fusion-splicing a second end of said hollow glass tube with said lead-out single mode fiber in a misalignment arrangement;

inscribing a curved waveguide inside said coreless fiber and said hollow glass tube, both ends of said curved waveguide coinciding with cores of said lead-in single mode fiber and said lead-out single mode fiber respectively, wherein said curved waveguide comprises a bent waveguide and a straight waveguide, said bent waveguide is located in said coreless fiber, said straight waveguide is located in said hollow glass tube, and said straight waveguide is parallel to a central axis of said hollow glass tube;

fabricating two micro-channels at both ends of said hollow glass tube, respectively, such that the two micro-channels form a microfluidic channel with a center of said hollow glass tube, thereby achieving a hybrid fiber coupler.

Further, said providing a coreless fiber, a hollow glass tube, a lead-in single mode fiber and a lead-out single mode fiber with preset lengths respectively, fusion-splicing a first end of said coreless fiber with said lead-in single mode fiber, and fusion-splicing a second end of said coreless fiber with a first end of said hollow glass tube includes:

fusion-splicing the lead-in single mode fiber with one end of the coreless fiber by a fiber fusion-splicing machine, and cutting the coreless fiber with a fiber cutter at a distance from the fusion-splicing point;

fusion-splicing the coreless fiber with one end of the hollow glass tube by the fiber fusion-splicing machine, and cutting the hollow glass tube with the fiber cutter at a distance from the fusion-splicing point.

Further, said curved waveguide is inscribed in said coreless fiber and said hollow glass tube with femtosecond laser.

Further, a micro-channel is fabricated at either end of said hollow glass tube with femtosecond laser.

The present application can achieve the following beneficial effects as compared to prior art. The hybrid fiber coupler according to embodiments of the present application includes a lead-in single mode fiber, a coreless fiber, a hollow glass tube and a lead-out single mode fiber. A curved waveguide is inscribed inside the coreless fiber and the hollow glass tube and cores of the lead-in single mode fiber and the lead-out single mode fiber are connected with the curved waveguide. The hollow glass tube has a micro-channel at either end, and the two micro-channels form a microfluidic channel with the center of the hollow glass tube for allowing the analytical liquid to access the hollow glass tube. The hybrid fiber coupler according to embodiments of the present application simplifies the construction of the device in which the analytical liquid accesses the hollow glass tube via a microfluidic channel to form a liquid waveguide by coupling with the solid waveguide and dynamic measurement of refractive index of the analytical liquid is implemented by monitoring a shift of coupling resonance peak of the hybrid waveguide. Meanwhile, the hybrid fiber coupler according to embodiments of the present application features cheap manufacturing materials, simplified structure and ease of fabrication.

DETAILED DESCRIPTION

In order to make the object, technical solution and advantages of the present application clearer, the present application will be further described in detail below with reference to accompanying drawings and embodiments. It should be understood that specific embodiments described herein serve only to explain the present application rather than limiting the present application.

Figure 1:
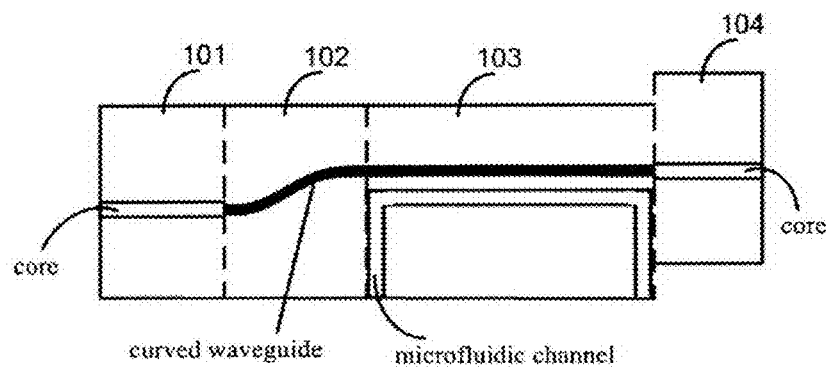
FIG. 1 is a schematic view of a structure of a hybrid fiber coupler according to an embodiment of the present application.

FIG. 1 shows a hybrid fiber coupler according to an embodiment of the present application which includes a lead-in single mode fiber 101, a coreless fiber 102, a hollow glass tube 103 and a lead-out single mode fiber 104. Both the lead-in single mode fiber 101 and the lead-out single mode fiber 104 include cores and claddings, respectively. Cores of the lead-in single mode fiber 101 and the lead-out single mode fiber 104 are not in the same horizontal direction.

A curved waveguide is inscribed inside the coreless fiber 102 and the hollow glass tube 103 and cores of the lead-in single mode fiber 101 and the lead-out single mode fiber 104 are connected with said curved waveguide. The hollow glass tube 103 has two micro-channels respectively in or near both ends thereof, and the two micro-channels form a microfluidic channel with the center of the hollow glass tube 103 for allowing the analytical liquid to access the hollow glass tube 103.

Figure 2:
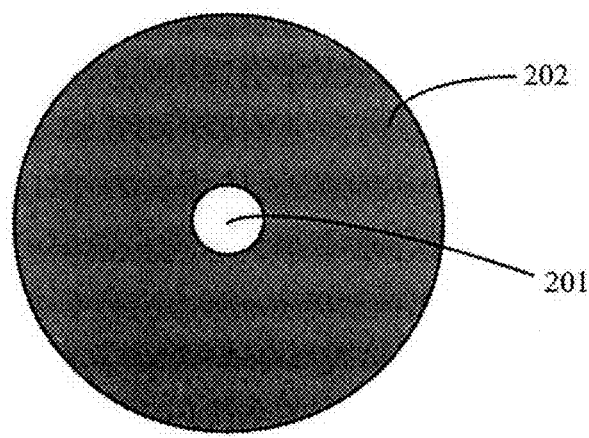
FIG. 2 is a sectional view of a lead-in single mode fiber according to an embodiment of the present application.

As shown in FIG. 2, the lead-in single mode fiber 101 and the lead-out single mode fiber 104 both have cores 201 and claddings 202, respectively. The curved waveguides inscribed inside the coreless fiber 102 and the hollow glass tube 103 are connected with cores of the lead-in single mode fiber 101 and the lead-out single mode fiber 104 respectively, that is, the curved waveguide is coincide with the cores.

Figure 3:
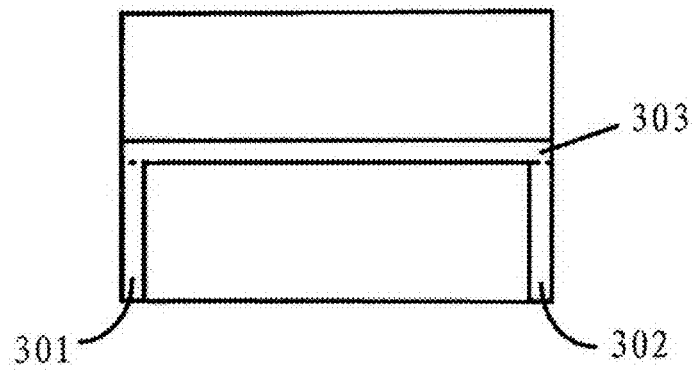
FIG. 3 is a schematic view of a structure of a microfluidic channel provided in embodiment of the present application.

As shown in FIG. 3, the hollow glass tube 103 has a micro-channel at either end respectively, namely micro-channels 301 and 302. The two micro-channels form a microfluidic channel with the center 303 of said hollow glass tube for allowing the analytical liquid to access said hollow glass tube.

The manufacturing flow of the hybrid fiber coupler according to an embodiment of the present application is shown in FIG. 4. With the single mode fiber in FIG. 4, the core and cladding satisfy the total reflection condition such that light may transmit a long distance with low loss in the core. The femtosecond laser interacts with the coreless fiber and the hollow glass tube to generate an optical waveguide with locally increased refractive index to transmit optical energy. Two micro-channels are burnt on sides of the hollow glass tube which form a U-shaped microfluidic channel with the center of the hollow glass tube, thereby facilitating the analytical liquid to be tested to access inside the hollow glass tube and forming a liquid waveguide. The curved waveguide is configured to connect the lead-in single mode fiber with the straight waveguide in the hollow glass tube. The straight waveguide is configured to implement directional coupling with the liquid waveguide formed by filling the hollow glass tube and connect the curved waveguide and the lead-out single mode fiber. In practical applications, all of the cores of the lead-in single mode fiber, the lead-out single mode fiber, the coreless fiber and the hollow glass tube are made of quartz that has different purities according to different piratical demands.

The manufacturing method of the hybrid fiber coupler according to an embodiment of the present application includes the following five steps.

Figure 4A:
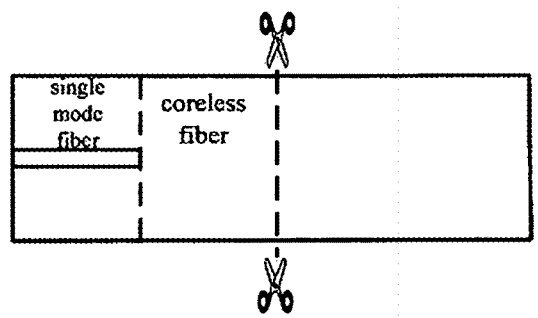
FIGS. 4a to 4f are manufacturing flow charts of a hybrid fiber coupler according to an embodiment of the present application.

In step I, the lead-in single mode fiber is fusion-spliced with one end of the coreless fiber by a fiber fusion-splicing machine, and the coreless fiber is cut with a fiber cutter at a distance from the fusion-splicing point, as shown in FIG. 4a.

Figure 4B:
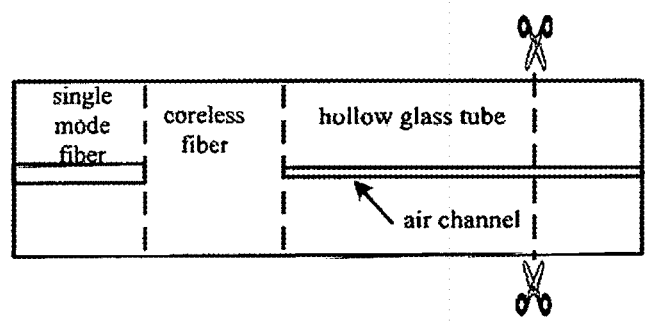

In step II, the coreless fiber is fusion-spliced with one end of the hollow glass tube by the fiber fusion-splicing machine, and the hollow glass tube is cut with the fiber cutter at a distance from the fusion-splicing point, as shown in FIG. 4b.

Figure 4C:
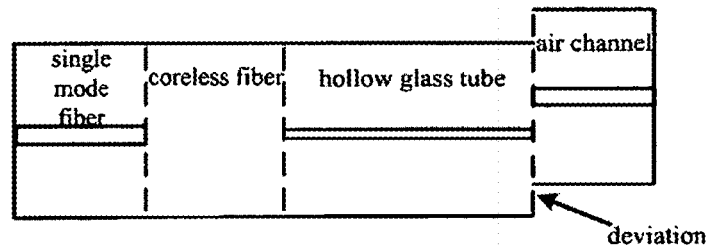

In step III, the hollow glass tube and the lead-out single mode fiber are fusion-spliced in a misalignment manner, as shown in FIG. 4c. Specifically, the extent of the misalignment between the hollow glass tube and the lead-out single mode fiber depends on the straight waveguide inscribed in the curved waveguide in a next step. Fusion-splicing in a misalignment manner aims to allow the core of the lead-out single mode fiber and the straight waveguide coincide.

Figure 4D:
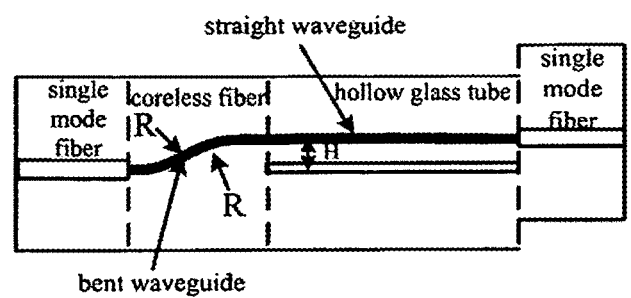

In step IV, a curved waveguide is inscribed inside the coreless fiber and the hollow glass tube with femtosecond laser which includes a bent waveguide and a straight waveguide in which the bent waveguide is located in the coreless fiber and the straight waveguide is located in the hollow glass tube. The straight waveguide is parallel to the central axis of the hollow glass tube with a spacing of H therebetween, wherein the spacing H is relevant to the coupling efficiency between the straight waveguide and the liquid waveguide. The both ends of the curved waveguide inscribed with the femtosecond laser coincide with the cores of the lead-in single mode fiber and the lead-out single mode fiber, respectively, as shown in FIG. 4d.

Figure 4E:
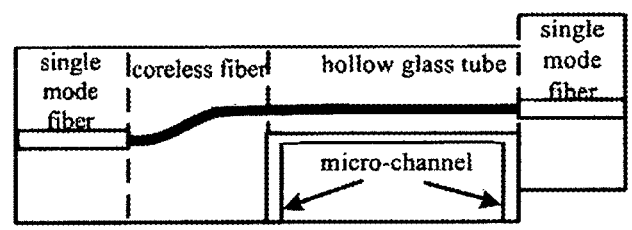

In step V, two micro-channels are fabricated in the side of the hollow glass tube with femtosecond laser, such that they form a U-shaped microfluidic channel with the hollow glass tube to allow the analytical liquid to access the hollow glass tube, as shown in FIG. 4e.

Figure 4F:
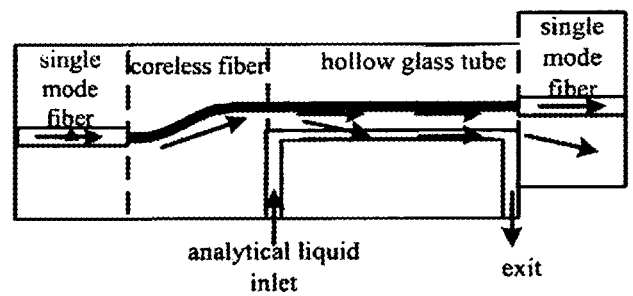

During the specific use, the optical signals are coupled into the inscribed curved waveguide via the lead-in single mode fiber and transmitted into the core of the lead-out single mode fiber through the curved waveguide and the straight waveguide. According to the coupled mode theory, when the phase matching condition is satisfied, two adjacent parallel waveguides will experience directional coupling. Due to the difference between dispersion curves, the liquid waveguide and the solid waveguide would resonate only in a certain wavelength range. When optical signals are traveling in the straight waveguide inscribed inside the hollow glass tube, partial light would be coupled into the liquid waveguide and lost in the form of cladding mode and finally results in a unique resonant loss peak in the spectrum output from the core of the lead-out single mode fiber. With the refractive index of the analytical liquid changes, the coupling peak will shift accordingly. The correspondence between the refractive index and the coupling peak is calibrated, to realize dynamic measurement of the index of analytical liquid, as shown in FIG. 4f.

Hereinbelow, an example is referred to for further describing the fabrication process and use of the hybrid fiber coupler according to embodiments of the present application.

First of all, a device is fabricated according to a certain size and order via a fiber fusion-splicing machine and a fiber cutter, in this device, a conventional single mode fiber—a coreless fiber—a hollow glass tube—a common single mode fiber are connected with each other. The coreless fiber has a length of 2 mm, the outer diameter and inner diameter of the hollow glass tube are 125 µm and 5 µm respectively, and the misalignment deviation for fusion-splicing in a misalignment manner of the hollow glass tube and the common single mode fibers is 15 µm.

Next, a bent waveguide and a straight waveguide are inscribed in the coreless fiber and the hollow glass tube with femtosecond laser. The bent waveguide has two radii of curvature, both of which are 50 mm, respectively. The straight waveguide is parallel to the axis of the hollow glass tube with a spacing of 15 µm, such that the central axis of the straight waveguide is aligned with the central axis of the lead-out single mode fiber. As used while fabricating the bent waveguide and the straight waveguide, the immersion objective has a numerical aperture of 1.25, the femtosecond laser outputs a wavelength of 532 nm, outputs a pulse width of 250 fs, the pulse repetition rate is 200 kHz, the energy of a single laser pulse is 250 nJ and the moving speed of the sample fiber is 200 µm/s. The sample fiber is the sample of the un-inscribed waveguide obtained by sequentially fusion splicing the lead-in single mode fiber, the coreless fiber, the hollow glass tube and the lead-out single mode fiber. Finally, two micro-channels are ablated on the side of the hollow glass tube via femtosecond laser, such that they form a U-shaped microfluidic channel with the center of the hollow glass tube to facilitate the analytical liquid to access the hollow glass tube. The resultant fiber device has a spectrum shown in FIG. 5 in which solid lines and dot and dash lines are spectral curves of the analytical liquid before and after entering the hollow glass tube respectively. The analytical liquid with a refractive index of 1.465876 enters the microfluidic channel to form a liquid waveguide.

Figure 5:
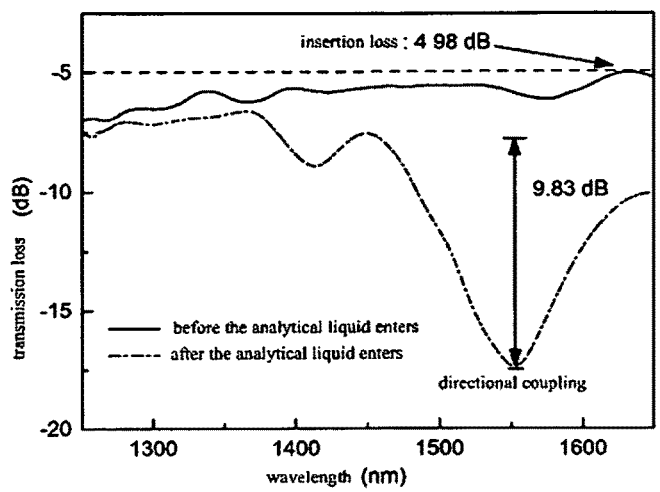
FIG. 5 is a transmission spectrum graph of the hybrid fiber coupler before and after the analytical liquid according to an embodiment of the present application enters it.
Figure 6:
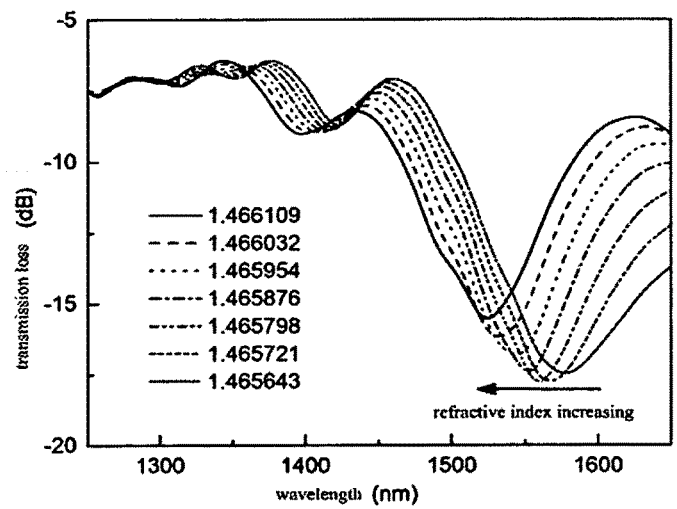
FIG. 6 is a schematic view of response to refractive index of the hybrid fiber coupler according to an embodiment of the present application.

As shown in FIG. 5, the solid waveguide and the liquid waveguide satisfy phase matching condition around 1550 nm. Optical signals transmitted in the solid waveguide would be coupled into the liquid waveguide and therefore a special loss peak would occur in the transmission spectrum. When the refractive index of the analytical liquid to be tested increases, the spectral curve shifts towards short wavelength as shown in FIG. 6. Accordingly, the hybrid coupler according to embodiments of the present application may be used to measure refractive indices of external environment.

Embodiments of the present application provide a hybrid waveguide coupler capable of measuring refractive index. As compared to prior art, the hybrid waveguide coupler has one of most prominent advantages, i.e., affording a simplified device structure, in which the analytical liquid accesses the hollow glass tube via a microfluidic channel to form a liquid waveguide by coupling with the solid waveguide and dynamic measurement of refractive index of the analytical liquid is implemented by monitoring the shift of coupling resonance peak of the hybrid waveguide. Meanwhile, the hybrid waveguide coupler according to embodiments of the present application features cheap manufacturing materials, simple structure and ease of fabrication.

Embodiments of the present application are applicable to the following fields.

(1) highly sensitive refractive index sensor: The analytical liquid accesses the hollow glass tube via a microfluidic channel to form a liquid waveguide by coupling so with the solid waveguide and dynamic measurement of refractive index of the analytical liquid is implemented by monitoring the shift of coupling resonance peak of the hybrid waveguide.

(2) highly sensitive temperature sensor: Liquid with high thermo-optical coefficient is filled in the hollow glass tube to form a liquid waveguide and UV-curable glue is filled in the micro-channels ablated by laser to guarantee the stability of the liquid waveguide. The refractive index of the liquid waveguide would vary as temperature changes and real-time measurement of temperature is implemented by monitoring the shift of coupling peak.

(3) tensile strain sensor: While the fiber device is under longitudinal stretch, the refractive index of liquid waveguide in the hollow glass tube does not change, while the refractive index of the inscribed waveguide changes due to the elasto-optical effect. Therefore, measurement of tensile strain may be implemented by monitoring the shift of coupling peak.

What have been described above are merely preferred embodiments of the present application rather than limiting the invention. Any modifications, equivalent substitutions and improvements made in the spirit and principle of the present application should be encompassed in the scope of the present application.

The invention claimed is:

1. A hybrid fiber coupler, comprising: a lead-in single mode fiber, a coreless fiber, a hollow glass tube and a lead-out single mode fiber which are fusion-spliced sequentially, wherein both said lead-in single mode fiber and said lead-out single mode fiber comprise cores and claddings respectively, and cores of said lead-in single mode fiber and said lead-out single mode fiber are not in a same horizontal direction;
   wherein a curved waveguide is inscribed inside said coreless fiber and said hollow glass tube, wherein the cores of said lead-in single mode fiber and said lead-out single mode fiber are connected with said curved waveguide respectively; and
   wherein said hollow glass tube has a micro-channel at either end thereof, respectively, the two micro-channels form a microfluidic channel with a center of said hollow glass tube for allowing an analytical liquid to access said hollow glass tube.

2. The hybrid fiber coupler of claim 1, wherein said curved waveguide comprises a bent waveguide and a straight waveguide, wherein:
   is said bent waveguide is located in said coreless fiber, said straight waveguide is located in said hollow glass tube, and said straight waveguide is parallel to a central axis of said hollow glass tube.

3. A method for manufacturing a hybrid fiber coupler, comprising:
   providing a coreless fiber, a hollow glass tube, a lead-in single mode fiber and a lead-out single mode fiber with preset lengths respectively, fusion-splicing a first end of said coreless fiber with said lead-in single mode fiber, and fusion-splicing a second end of said coreless fiber with a first end of said hollow glass tube;

fusion-splicing a second end of said hollow glass tube with said lead-out single mode fiber in a misalignment arrangement;

inscribing a curved waveguide inside said coreless fiber and said hollow glass tube, both ends of said curved waveguide coinciding with cores of said lead-in single mode fiber and said lead-out single mode fiber respectively, wherein said curved waveguide comprises a bent waveguide and a straight waveguide, said bent waveguide is located in said coreless fiber, said straight waveguide is located in said hollow glass tube, and said straight waveguide is parallel to a central axis of said hollow glass tube;

fabricating two micro-channels at both ends of said hollow glass tube, respectively, such that the two micro-channels form a microfluidic channel with a center of said hollow glass tube, thereby achieving a hybrid fiber coupler.

4. The method of claim 3, wherein said providing a coreless fiber, a hollow glass tube, a lead-in single mode fiber and a lead-out single mode fiber with preset lengths respectively, fusion-splicing a first end of said coreless fiber with said lead-in single mode fiber, and fusion-splicing a second end of said coreless fiber with a first end of said hollow glass tube comprises:

fusion-splicing the lead-in single mode fiber with one end of the coreless fiber by a fiber fusion-splicing machine, and cutting the coreless fiber with a fiber cutter at a distance from the fusion-splicing point;

fusion-splicing the coreless fiber with one end of the hollow glass tube by the fiber fusion-splicing machine, and cutting the hollow glass tube with the fiber cutter at a distance from the fusion-splicing point.

5. The method of claim 3, wherein said curved waveguide is inscribed in said coreless fiber and said hollow glass tube with femtosecond laser.

6. The method of claim 3, wherein a micro-channel is fabricated at either end of said hollow glass tube with femtosecond laser.

* * * * *